United States Patent [19]

Horstmann

[11] Patent Number: 4,581,525
[45] Date of Patent: Apr. 8, 1986

[54] MAGNETIC CODING ARRANGEMENT FOR WORKPIECE-CARRIERS

[76] Inventor: Frank R. Horstmann, Hirtenstrasse 3, D-8012 Ottobrunn, Fed. Rep. of Germany

[21] Appl. No.: 515,165

[22] Filed: Jul. 19, 1983

[30] Foreign Application Priority Data

Jul. 19, 1982 [DE] Fed. Rep. of Germany ....... 3226939
Mar. 10, 1983 [DE] Fed. Rep. of Germany ....... 3308603
Apr. 11, 1983 [DE] Fed. Rep. of Germany ....... 3312949

[51] Int. Cl.$^4$ ............................................. G06K 19/06
[52] U.S. Cl. .................................... 235/493; 235/449; 365/62
[58] Field of Search ....................... 235/449, 450, 493; 365/62; 340/764, 815.26, 815.27

[56] References Cited

U.S. PATENT DOCUMENTS

| 3,074,353 | 1/1963 | Devonshire et al. | 235/493 X |
|---|---|---|---|
| 3,100,040 | 8/1963 | Kleist . | |
| 3,157,270 | 11/1964 | Prucha et al. . | |
| 3,460,115 | 8/1969 | Leone | 365/62 X |
| 3,518,664 | 6/1970 | Taylor | 340/815.26 |
| 3,538,311 | 11/1970 | Weidmann | 235/450 X |
| 3,714,664 | 1/1973 | Fayling . | |
| 3,825,927 | 7/1974 | Passien | 340/764 X |

FOREIGN PATENT DOCUMENTS 1092708 5/1961 Fed. Rep. of Germany .
1288195 1/1969 Fed. Rep. of Germany .

Primary Examiner—David L. Trafton
Attorney, Agent, or Firm—Wegner & Bretschneider

[57] ABSTRACT

A magnetic coding arrangement (43) has a holder (11) in which small disk-shaped magnets (14) are mounted in bores (25). The magnets have different polarization (N, S) on their end faces. The diameter (D) of the magnets is slightly less than the diameter of the bores, so that the magnets can swing round freely in the bores where an outer magnetic field acts on them. Each magnet is retained in a particular end position by a soft-magnetic contact (20.1) which consists of a layer of soft-magnetic powder.

Magnetic coding arrangements of this type are used, for example on workpiece-carriers so that these can be provided with the code of a workplace.

10 Claims, 14 Drawing Figures

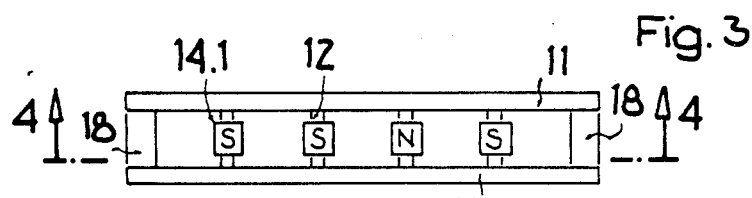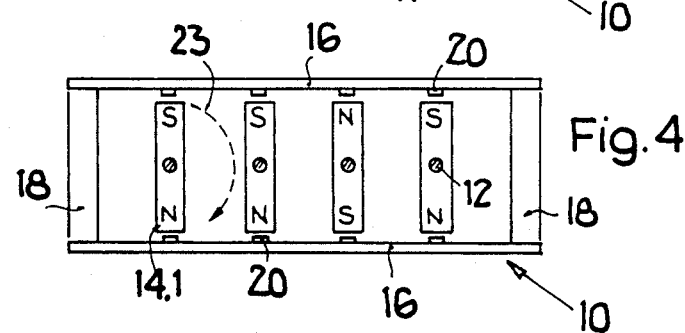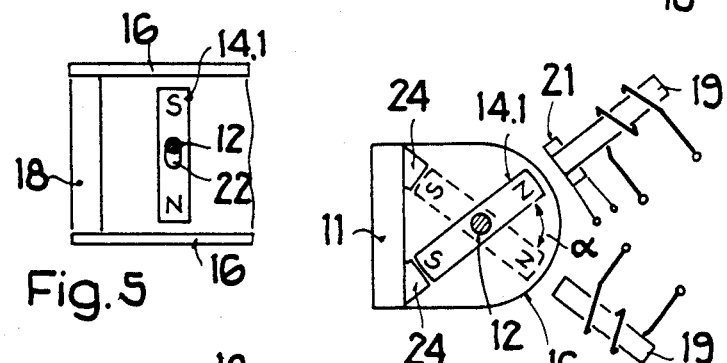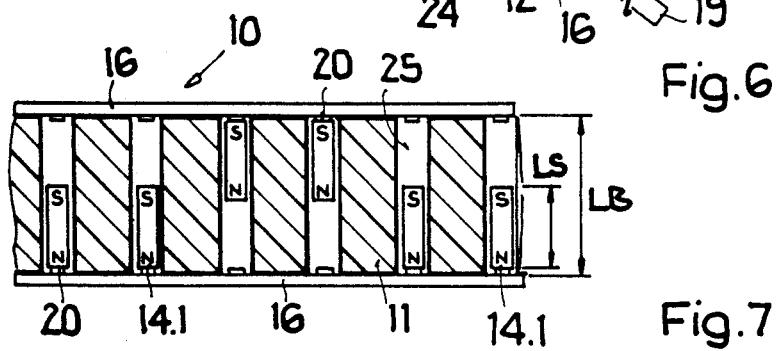

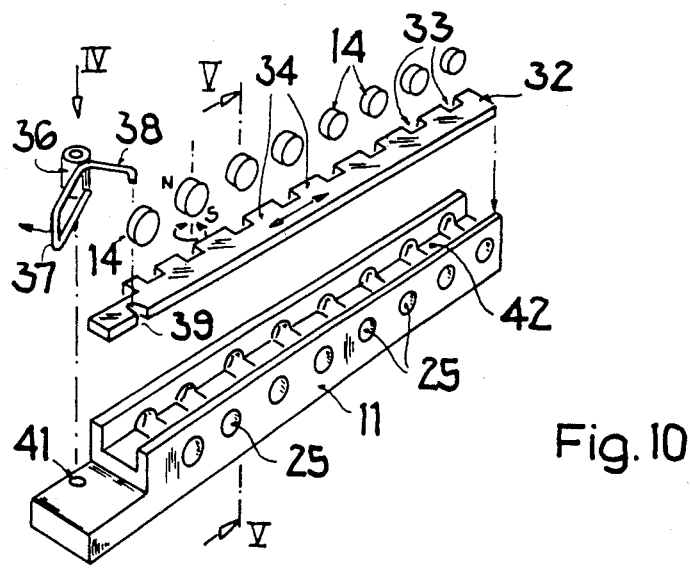
Fig. 10
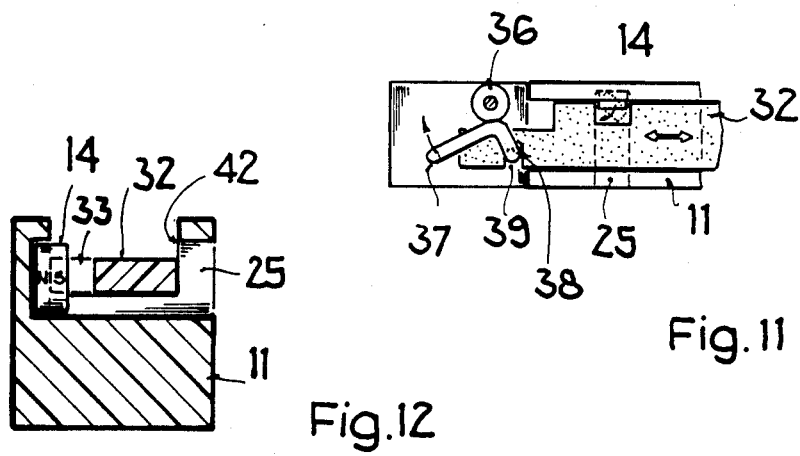
Fig. 11
Fig. 12

MAGNETIC CODING ARRANGEMENT FOR WORKPIECE-CARRIERS

The invention relates to a magnetic coding arrangement for workpiece-carriers with several magnets which are mounted in a holder and the successive directions of magnetization of which represent a binary-coded decimal number.

A coding arrangement on a workpiece-carrier generally serves for guiding the workpiece-carrier, and consequently a workpiece transported by it, to a specific workplace. During the production process on the workpiece, various operations must be carried out on this, such as, for example, milling, polishing, washing or soldering. Each operation is carried out at a specific workplace. In large-scale production, the workpieces are transported from one workplace to another via a conveying means. As a rule, a specific code is assigned to each workplace. When the workpiece is to be transported automatically to a specific workplace, the workpiece-carrier must be provided with the code of the workplace.

A workpiece-carrier has for a long time been coded automatically with the code of a specific workplace, specifically, as a rule, by means of a mechanical binary code. In this case, pins adjustable by means of a pneumatic device are used. When the pin projects from its mounting, this corresponds to the logical value "1", and otherwise to the logical value "0".

In addition to this mechanical coding device, magnetic coding arrangements have also been known for a long time but it has not been possible for these to be successful against mechanical coding arrangements under production conditions, since a very short distance between a code-recording device and the workpiece-carrier is necessary for magnetic coding. A magnetic coding arrangement is known, for example, from U.S. patent specification No. 3,173,533. It has several magnets which are mounted in a holder and which can be magnetized from outside. The magnets can be magnetized in two directions of polarization, one of which corresponds to the logical value "1" and the other to the logical value "0". Such a code, for example "0010010", is written into seven successive magnets on the workpiece-carrier. A reproducing device at a particular workplace reproduces the code. As already stated at the beginning of this paragraph, there is the problem of adhering to very low tolerances, specifically both for recording and reproducing. The distance between the recording and reproducing heads and the magnets should be at most approximately 0.5 millimeters from the magnets, whose directions of magnetization are to be reversed. It is extremely difficult to satisfy this condition under production conditions.

The object on which the invention is based is to design a magnetic coding device of the type known from U.S. patent specification No. 3,173,533, in such a way that the distance between the magnets mounted in a holder and a recording head can be greater than in magnetic coding arrangements known hitherto.

This object is achieved when, instead of magrets whose directions of magnetization are to be reversed, hard magnets are used according to the invention, and these are mounted so that they can assume two end positions which are assigned the two logical values "0" and "1". As is generally known, one magnet mounted, for example, on a shaft can rotate even from a large distance when it approaches another magnet. To reverse the direction of magnetization of the magnet mounted on the shaft, a magnetic field which is stronger by several orders of magnitude would have to be used. It is directly evident from this that in the arrangement according to the invention it is no loqger necessary to bring a magnet and a reproducing head almost directly up against one another, as is known in the reversal of magnetization.

Consequently, by means of the arrangement according to the invention, greater reproducing distances can be maintained. The direct result of this is that less positioning accuracy is also required, thus leading to considerable simplification of the reproducing circuit. However, not only is a simplification of the logical structure of the circuit possible, but also smaller dimensions, since considerably lower currents are necessary for recording than were required for reversal of magnetization. This means that the reproducing instruments for coding a magnetic coding arrangement become considerably cheaper. Because of the lower recording currents required, it is also possible to record all the magnets of the arrangement at the same time. In practical magnetic coding arrangements known hitherto, recording was carried out only sequentially because of the high outlay required for the recording instrument.

Known magnetic coding arrangements working on the principle of reversal of magnetization use magnetizing pulses with a length of approximately 0.1 milliseconds. At a recording distance of 0.5 millimeters, the recording power is approximately 10 kW and at a recording distance of 1 millimeter it is approximately 30 kW. In contrast to this, it was ascertained experimentally for a magnetic coding arrangement according to the invention that at a recording distance of 5 millimeters and a pulse length of 5 milliseconds it is sufficient to use a recording power of 0.576 watts to re-record the coding arrangement.

A particularly simple design is obtained when the magnets are held in a mounting in which they can swing round freely between the two end positions. In this case, it is merely necessary to use, for example, a bar-shaped plastic holder with bores in each of which a magnet is located.

When the magnets are arranged so that they can swing round freely, as indicated in the previous paragraph, or, for example, are freely rotatable on a shaft, it is necessary, after the magnets have been set in an end position, to retain them in this position. It is especially advantageous here to use a soft-magnetic contact by which the aligned magnet is retained in its particular position. The advantage of such a soft-magnetic contact is that it focusses the field of a recording magnet somewhat and thereby further reduces the recording power required. However, it is necessary, for this purpose, that the soft-magnet contact should be made only so large that it does not mask the magnet to be aligned. Advantageously, the soft-magnet contact is formed by a soft-magnetic powder which is suspended in hardened plastic, for example directly in the plastic of the magnet-holder.

The arrangement according to the invention has the further advantage that the recorded information can be identified directly visually as a result of the different /positions of the magnets. If, for example, magnets mounted rotatably or tiltably with a north pole marked blue and with a south pole marked red are used, the coded workplace can be identified directly by the sequence of blue and red markings. A card with a color sequence can then be assigned to each workplace, so that by comparing the color card with the color sequence in the magnetic coding arrangement each operator can easily establish whether the correct workplace is coded or which workplace is recorded on the workpiece-carrier. A change in the coding can also be achieved by hand, for example by means of a bar magnet, in a very simple way. The arrangement according to the invention thus has, as regards its practical suitability in production, numerous advantages in comparison with magnetic coding arrangements known hitherto.

The invention and advantageous developments and embodiments of this are illustrated in more detail below with reference to Figures in which:

FIG. 3 shows a second embodiment of a magnetic coding arrargement according to the invention, with magnets mounted rotatably;

FIG. 4 shows a plan view of the magnetic coding arrangement according to FIG. 3 along the section 4—4 in FIG. 3;

FIG. 5 shows a diagrammatic partial section illustrating a special mounting of a rotatably mounted magnet;

FIG. 6 shows a side view of a magnetic coding arrangement according to the invention, with tiltable magnets;

FIG. 7 shows a section through a magnetic coding arrangement according to the invention, with displaceable magnets;

FIG. 10 shows a perspective exploded representation of a second embodiment of a magnetic coding device according to the invention, with a braking device different from that in the embodiment according to FIG. 8.

FIG. 11 shows a partial plan view of the magnetic coding device according to FIG. 10, seen in the direction of the arrow IV in FIG. 10;

FIG. 12 shows a sectional representation through the magnetic coding device according to FIG. 10, seen in the direction of the arrows on the section line V—V in FIG. 10;

Figure 13:
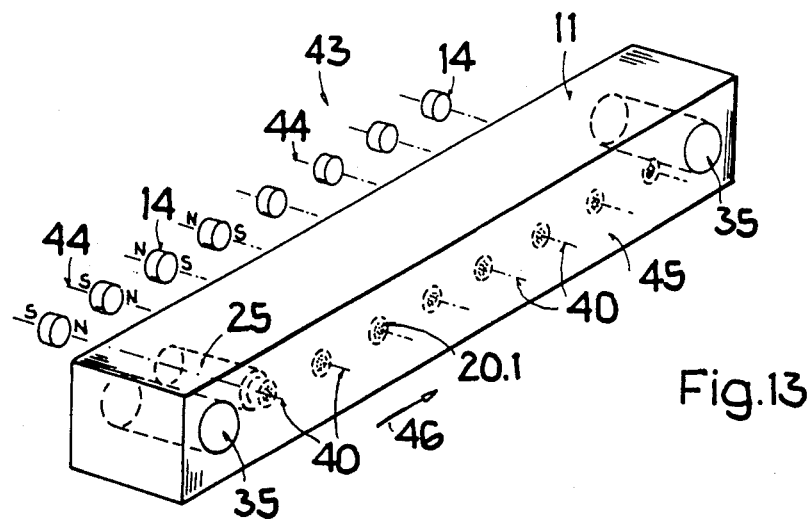
Figure 14:
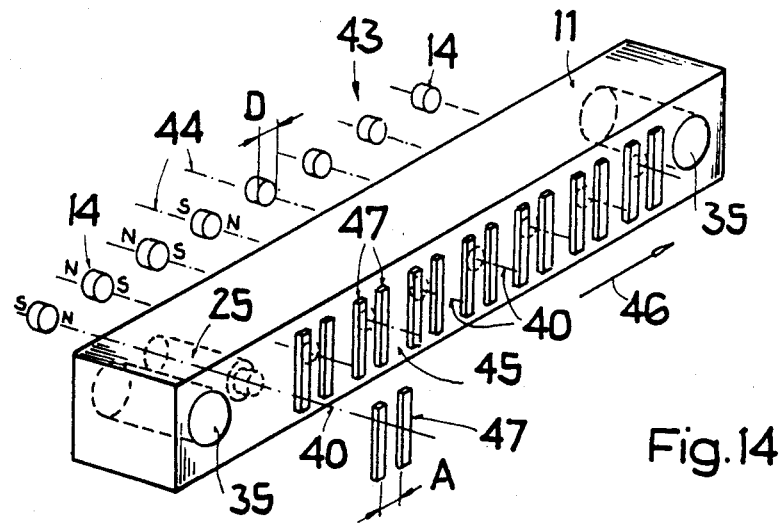

FIG. 13 shows a diagrammatic perspective view of a third embodiment of a magnetic coding arrangement according to the invention, with tiltable magnets, soft-magnetic contact devices consisting of soft-magnetic powder being attached to the holder; and FIG. 14 shows a diagrammatic perspective view of an arrangement according to FIG. 13, to the holder of which are attached soft-magnetic bars parallel to one another.

Figure 1:
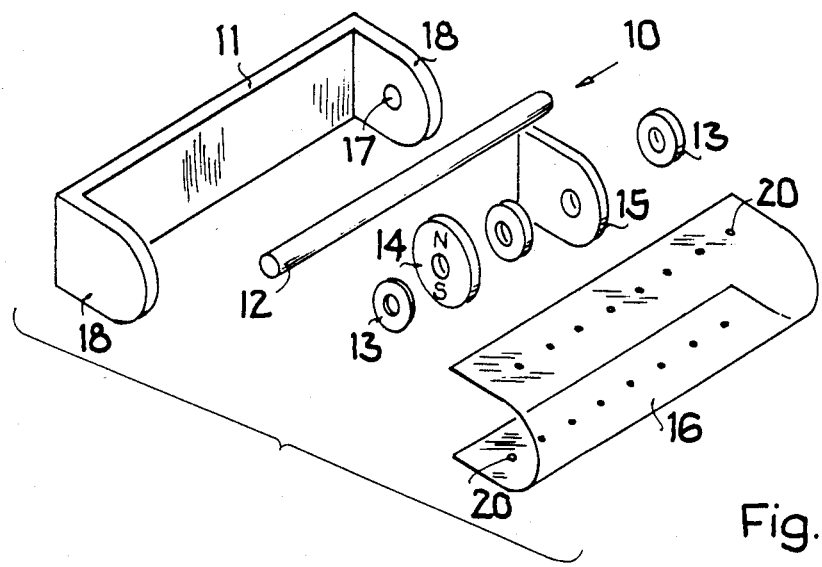
FIG. 1 shows a perspective exploded representation of a magnetic coding arrangement according to the invention, with magnets mounted rotatably.
Figure 2:
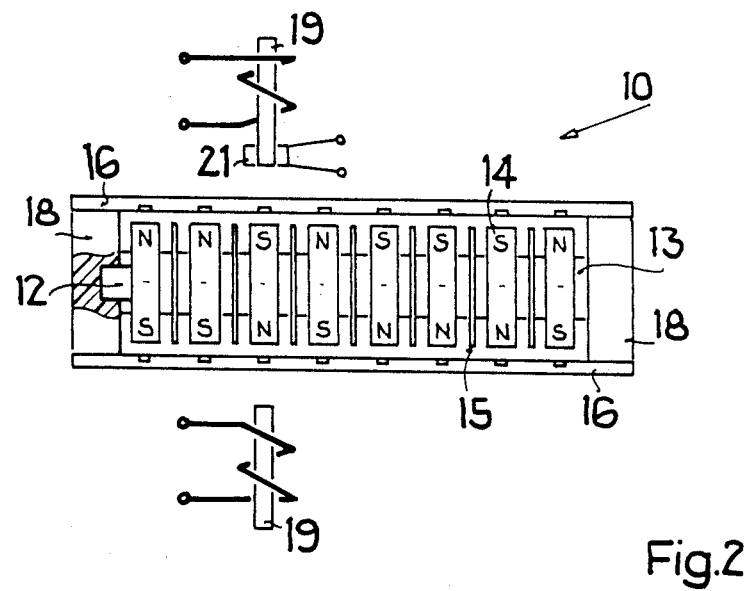
FIG. 2 shows a front view of the magnetic coding arrangement according to FIG. 1, with outer coding magnets acting on its magnets.

The magnetic coding arrangement 10 according to FIGS. 1 and 2 has a holder 11, a bearing shaft 12, spacer rings 13, magnetic rings 14, screening plates 15 and a dust-proof casing 16. As can be seen from the front view of FIG. 2, eight magnetic rings 14 altogether are mounted on the bearing shaft 12. Their fields are screened from one another by the screening plates 15 made of soft iron. This allows the position of the individual magnets to be detected more accurately. However, the screening plates 15 are not absolutely necessary. A spacer ring 13, a magnetic ring 14, a spacer ring 13, a screening plate 15, and then again a spacer ring 13, a magnetic ring 14, etc., follow one another in succession. The bearing shaft 12 is mounted in bearings 17 in the holder 11 in such a way that the side walls 18 of the holder 11 do not press on the outer spacer rings 13, with the result that the magnetic rings 14 can rotate on the bearing shaft 12 with as little friction as possible.

The magnetic rings 14 each have a north pole and a south pole symmetrically in relation to the bearing shaft 12. The magnetic rings 14 can be so rotated by magnetizing heads 19 of a recording instrument that either their north pole or their south pole is located at the top in a predetermined way. By shifting the magnetic coding arrangement 10 past the magnetizing heads 19 in the direction of the bearing shaft 12, one magnetic ring 14 after the other comes into the region of alignment of the magnetizing heads 19, so that after the magnetic coding arrangement has passed through the magnetizing heads all the magnetic rings 14 are aligned in the predetermined way.

There is now the problem of maintaining the aligned magnetic rings 14 in the positions into which they have been rotated by the magnetizing heads 19, so that the coded number once recorded can be reproduced repeatedly. To retain the magnetic rings 14 in their positions, there are, in the exemplary embodiment of FIGS. 1 and 2, soft-magnetic plates 20 which are arranged on the dust-proof casing 16 in such a way that they are at the shortest distance from the aligned poles. The soft-magnetic plates 20 are magnetized respectively by the poles of the magnetic rings 14, with the result that a retaining force arises between a particular pole on a magnetic ring 14 and the particular soft-magnetic plate 20 directly adjacent to it. The soft-magnetic plates 20 are selected in only such a size that the aligning magnetic field of the magnetizing heads 19 can act without substantial weakening on the poles of the magnetic rings 14.

A sensor 21 series for reading the information recorded in the magnetic coding arrangement 10 and establishes whether the north pole or the south pole points towards the sensor in a particular magnetic ring 14. As illustrated in FIG. 2, the sensor 21 can be arranged directly on the magnetizing head 19, so that a recording and reproducing arrangement is obtained, or there can be a recording arrangement having magnetizing heads 19 only and a reproducing arrangement having sensors 21 only. However, this is not important for the arrangement of the magnetic rings 14 by which a number is stored in a binary code.

The material of the magnetic rings 14 is advantageously selected so that as high a retentivity as possible and as high a coercive force as possible can be achieved. The result of this is, on the one hand, that as high a rotary force as possible is obtained by means of a strong field of the magnetic rings 14 in interaction with the magnetic field of the magnetizing head 19 and that, on the other hand, reversal of the magnetization of the magnetic rings 14 by magnetic fields which usually occur is not possible. These conditions apply to all magnets of the embodiments according to the invention of magnetic coding arrangements. This is because the principle of the invention is to design magnets in magnetic coding arrangements no longer so that their magnetization can be reversed and so that they are fixed, but of invariable magnetization, but of variable position.

Whereas, in the magnetic coding arrangements known hitherto, it was necessary for interaction with a magnetizing head 19 that it should be possible for the latter to be brought up to approximately 0.5 millimeters from a magnet whose magnetization was to be reversed as a result of the newly applied principle of changing the position of a magnet of fixed magnetization it is possible to provide distances of 20 to 50 millimeters. The advantage of this is that the magnetic coding arrangement according to the invention can also be used on workpiece-carriers which run on conveying means not guaranteeing track guidance to tenths of a millimeter. This has the further advantage, that the positioning accuracy in the direction of the bearing shaft 12 must be less than the corresponding positioning accuracy in known magnetic coding arrangements. When, in known magnetic coding arrangements, the best possible position between a magnetizing head and a magnet was shifted, for example, by 2 millimeters, it was no longer possible to reverse the magnetization of the corresponding magnet. However, at recording distances of 20 to 50 millimeters in a magnetic coding arrangement according to the invention, a displacement in the direction of the bearing shaft 12 of, for example, two millimeters still has no negative influence on the possibility of rotation of an associated magnet. Consequently, in a magnetic coding arrangement according to the invention, there is also no need for additional magnets at the beginning and end of the series of magnets ensuring the actual storage. However, such additional magnets, which serve only for exact fixing of position and as a counting aid, can also be combined with a magnetic coding arrangement according to the invention in a way which is known as regards their effect.

Not only is a result of the magnetic coding arrangement according to the invention that magnetizing heads 19 and sensors 21 can be located further away from the magnets than in hitherto existing arrangements, but it is also possible to make do with considerably lower recording currents and with only one magnetizing head instead of several. Thus, in the arrangement according to FIG. 2, for example the lower magnetizing head 19 can even be omitted if it were unfavourable, for example as regards construction, to attach to a conveying means a recording arrangement which surrounds the magnetic coding arrangement at the top and bottom on a workpiece-carrier running on the conveying means. On the contrary, an individual magnetizing head 19 can be arranged at a point which is particularly favourable in terms of construction. Also because of this, the magnetic coding arrangement according to the invention can be used for workpiece-holders in a more versatile way than magnetic coding arrangements known hitherto.

In the embodiment of a magnetic coding arrangement 10, illustrated in FIG. 2, the soft-magnetic plates 20 are cast into the dust-proof casing 16. However, they can also, for example, be glued onto the casing, as shown in FIGS. 4 and 7, or they can be fastened separately to the holder 11 or to another special component.

It is not absolutely necessary to retain the magnetic rings 14 in their set positions by means of soft-magnetic plates 20, but it is also possible to exert slight pressure from the bearings 17 on the spacer rings 13 and the magnetic rings 14, so that the magnetic rings 14 are retained by frictional forces. However, larger fields of the magnetizing heads 19 will then be required to rotate the magnetic rings 14 180° from one position to the other. The position of the magnetic coding arrangement 10 in space is not important in the case of retention either by magnetic forces or by frictional forces. In contrast to this, FIG. 5 shows a retaining arrangement in which bar magnets 14.1 are used instead of magnetic rings 14 and which is to be attached to a workpiece-carrier so that the bar magnets 14.1 are arranged vertically. The bar magnets 14.1 have in their center a slot 22 through which a circular bearing shaft 12 engages. As a result of this type of mounting, a bar magnet 14.1 hangs in a stable equilibrium in its position which has been set by a magnetizing head 19. The advantage of this arrangement is that only very slight frictional forces have to be overcome during rotation of a bar magnet 14.1 through 180° and that there is no weakening of an outer magnetic field by soft-magnetic plates.

In the embodiment of a magnetic coding arrangement 10 according to FIGS. 1 and 2, all the magnetic rings 14 are arranged successively on a common bearing shaft 12. This results in a relatively wide construction. A narrower construction is made possible by an arrangement according to FIGS. 3 and 4. In this, bar magnets 14.1 are mounted on a common holder 11, each with their own bearing shaft 12. All the bearing shafts 12 are parallel to one another. The bar magnets 14.1 are arranged at such a distance from one another that only one bar magnet after another can be rotated at a particular time, as illustrated by the turning circle 23 shown by broken lines. If it is to be possible for all the bar magnets 14.1 to rotate simultaneously without obstructing one another, then the distances between the bearing shafts 12 must be made correspondingly greater. Instead of bar magnets 14.1, magnetic rings 14 can also be used, as in the embodiment according to FIGS. 1 and 2. The outer form of a magnet is completely irrelevant for the action of the magnetic coding arrangement 10. It is important merely that in the embodiments in which a magnet is rotated by 180° this magnet should have two unlike poles symmetrical to the axis of rotation.

In a magnetic coding arrangement 10, it is not absolutely necessary, however, for a particular rotation of a magnet to be effected through 180° to represent a first or second binary state. Merely tilting from one position to another can also be carried out, as shown with reference to the embodiment according to FIG. 6. A magnetic coding arrangement 10 according to FIG. 6 has several bar magnets 14.1 on a common bearing shaft 12, although this cannot be seen in the illustration according to FIG. 6, since this gives a view in the direction of the bearing shaft 12. One position of the bar magnet 14.1, in which its north pole N is located at the top, is shown by unbroken lines, whilst the other position, in which the north pole N is located at the bottom, is shown by broken lines. The two positions differ from one another in an angle of rotation $\alpha$ of approximately 60°. A sensor 21, which interacts with the magnetic coding arrangement 10 and which is arranged so that the north pole N located at the top is nearer to it than the north pole N rotated downwards and away from it, detects this very fact of being located nearer or further away. The upper position corresponds, for example, to the binary value "1" and the lower position to the binary value "0".

The advantage of the tilting arrangement according to FIG. 6 is that it is possible to retain the bar magnets 14.1 in the two end positions in an especially effective way. In particular, a south pole S arranged symmetrically to the north pole N as regards the bearing shaft 12 interacts with magnetic shoes 24 fastened to a holder 11. The magnetic shoes 24 can be made of soft iron or they can have slight fixed magnetization, specifically with a north pole facing the south pole on the bar magnet 14.1. As a result, each bar magnet 14.1 can be retained in each end position in a very stable manner, without the magnetic field of a magnetizing head 19 being weakened by soft-magnetic plates between the magnetizing head 19 and the end of a magnetic bar 14.1. In the magnetic coding arrangement 10 with tiltable bar magnets 14.1, it is advantageous to select the tilting angle between the two end positions as at most approximately 90°.

Whereas the previously described embodiments of magnetic coding arrangements 10 have rotatable or tiltable magnets, the embodiment according to FIG. 7 illustrates an arrangement with displaceable bar magnets 14.1. Bores 25 matching the shape of the bar magnets 14.1 are cut out in a holder 11. The length LS of the bar magnets 14.1 is less than the length LB of the bores 25. As a result, the bar magnets can be displaced into two end positions, in each of which one of their ends rests against a respective end of a bore. The bar magnets 14.1 are, again, magnetized with unlike poles at their ends, so that they can be displaced by magnetic fields from one position to the other. A sensor which is guided past the bores 25 on the holder 11 then establishes again whether a particular magnet is located at the side of a bore past which the sensor is guided or at the farther end of the bore. Magnetizing heads and sensors can also act from both ends of the bores 25. Again, the bores 25 are closed off from outside by a dust-proof casing 16. The bar magnets 14.1 are retained in the bores either as a result of frictional forces or, again, by soft-magnetic plates 20 which are fastened to the dust-proof casing 16. The soft-magnetic plates 20 should, again, only be so large that they can retain a bar magnet 14.1 in its position, but do not substantially weaken the field of a magnetizing head. If a magnetizing head engages only from one side of a bore, the soft-magnetic plate on the opposite side of the bore can also take up the entire bore diameter, and a material which is not entirely soft-magnetic, but a slightly magnetized material can even be used, as was described in connection with the embodiment according to FIG. 6.

It is especially advantageous, in all the embodiments, to make the dust-proof casing 16, if one is used, of transparent material. It can then be seen directly from outside how the individual magnets of the magnetic coding arrangements 10 are set. In the embodiments according to FIGS. 6 and 7, this can be seen directly as a result of the particular positions of the magnets. In the embodiments according to FIGS. 1 to 5, it is advantageous to provide the magnets with a color marking according to their polarity, for example with blue for the side of the north pole and with red for the side of the south pole. The correct coding of a magnetic coding arrangement 10 can then be ascertained in a very simple way by mere observation or by special electromagnetic measuring means. Reversal of magnetization is also possible without any problem in magnetic coding arrangements 10 according to the invention, since only an adjustment of position of the individual magnets and not reversal of the magnetization of these is required for this purpose. The change in position can be carried out easily by hand if there is no dust-proof casing 16 or if this is removed, or magnetization can be carried out by hand through the dust-proof casing 16 by means of a bar magnet.

Magnetic coding arrangements, according to the invention, for workpiece-carriers can be designed as a separate component connected to the workpiece-carrier, or the holders of the magnetic coding arrangement can be integrated directly into the workpiece-carrier. This is possible in an especially simple way in the embodiment according to FIG. 7 where the bores 25 can be provided in the workpiece-carrier. It is merely necessary, then, to introduce bar magnets 14.1 into these bores and subsequently close the bores by means of the dust-proof casing 16.

The geometric dimensions of the magnets can be varied within wide limits. When a magnetic coding arrangement is required for very small workpiece-carriers, magnets having dimensions of only a few millimeters are used, whilst larger magnets are appropriately also used for large workpiece-carriers. The larger a workpiece-carrier, the less accurately it is guided as a rule and the greater play must therefore be allowed between the magnets and the magnetizing heads. The larger the magnets used, the larger their fields, and their positions can then be changed from correspondingly greater distances.

A magnetically actuable brake can also be provided advantageously for retaining the magnets in their aligned positions. In the embodiment according to FIGS. 1 and 2, this can consist of a brake rod which extends parallel to the bearing shaft 12 and which is attracted magnetically to the end faces of the magnets. This brake rod will consist, at least at one end, of magnetizable material or will be provided with a magnet, so that it can be lifted off from the magnets for the duration of the coding operation so as to allow them to rotate.

Instead of a brake acting jointly on all the magnets, there can also be a braking device in which the individual brakes act individually on each magnet. These individual brakes can consist, for example, of elastic magnetizable plates which are fastened to the holder 11 or to the dust-proof casing 16 and which press on the magnets. When a magnetizing head 19 then acts on a magnet 14, it lifts the brake plate off the magnet at the same time, so that the latter can rotate freely. With the field of the magnetizing head being cancelled, the force on the magnetic plate is then removed at the same time, so that the latter presses on the magnet again. To perform this function, the geometric design and the magnetic and elastic properties of the brake plates must be selected appropriately.

A braking device of this type is also described below in connection with FIGS. 8 and 9.

Figure 8:
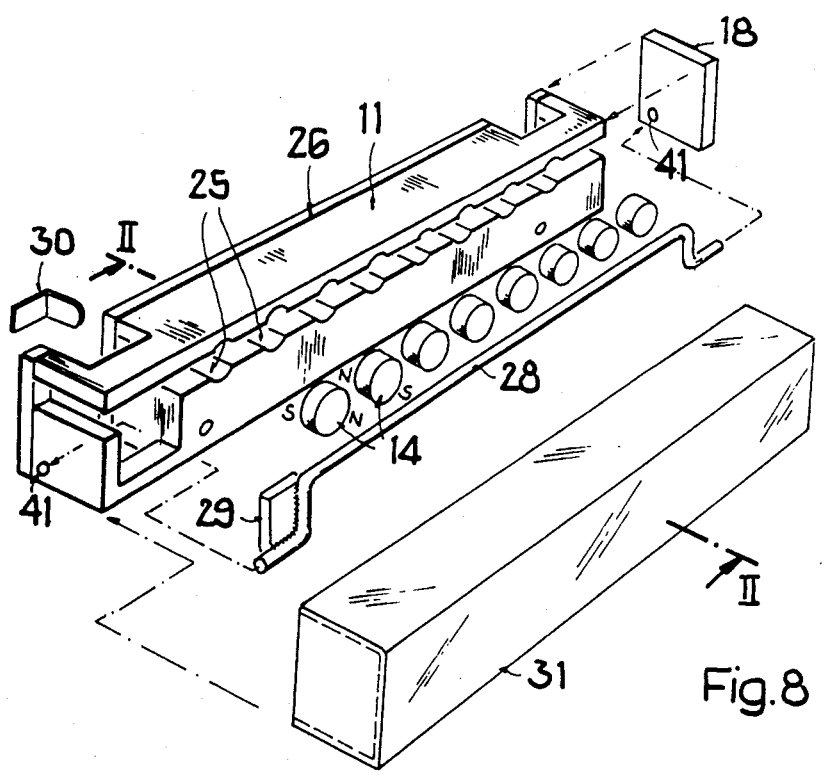
FIG. 8 shows a perspective exploded representation of a first embodiment of a magnetic coding device according to the invention, with tiltable magnets.
Figure 9:
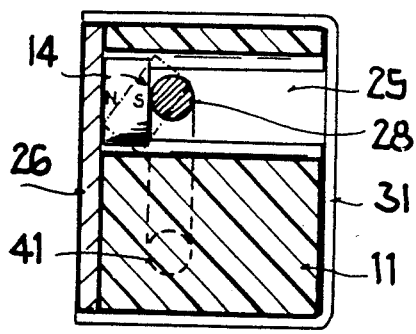
FIG. 9 shows a sectional representation of the device according to FIG. 8, seen in the direction of the arrows on the sectional line II—II in FIG. 8.

Like the further Figures up to and including FIG. 14, FIGS. 8 and 9 illustrate magnetic coding arrangements having magnets which are mounted tiltably in recesses in the holder. These arrangements are characterized by an especially simple construction which can be produced extremely cheaply. Despite the simple construction, all the advantages described in connection with the preceding embodiments are preserved in full.

The three exemplary embodiments illustrated in FIGS. 8 to 14 differ essentially in different retaining measures for magnets which are brought into the end positions. In the embodiment according to FIGS. 8 and 9, retention is effected by means of a brake rod, in the embodiment according to FIGS. 10 to 12 it is effected by a slide, and in the embodiments according to FIGS. 13 and 14 it is effected by soft-magnetic contacts.

The magnetic coding device according to FIGS. 8 and 9 has a bar-shaped holder 11 with a plurality of bores 25 which extend in its transverse direction and which are closed, on the front side facing away from an observer, by a cover sheet 26 made of non-magnetic material, for example plastic. Small disk-shaped magnets 14 are inserted in the bores 25, specifically in such a way that they butt against the inner face of the cover sheet 26. The diameters of the bores 25 are calculated so that the magnets 14 are guided loosely within these bores. The bores 25 are connected to one another by a slit 27 which lies in the longitudinal extension of the holder 11 and into which engages a brake rod 28 which is bent at its two ends and which is retained in bearing bores 41 in side parts 18 of the holder 11. The brake rod 28 is provided, in the region of its end on the left in FIG. 8, with a soldered-on or glued-on brake magnet 29 opposite which is located an iron plate 30 serving for retaining the brake rod 28, when the brake magnet 29 is not excited, in a position fixing the magnets 14 in place in the respective bores 25. When magnets 14 are inserted into the bores 25, the entire holder 11 is covered substantially hermetically by a hood 31 made of non-magnetic material, for example aluminum.

FIG. 9 indicates how the brake rod 28 fixes the magnets 14 in their reproduction position (resting against the cover 26). When the polarity of a magnet 14 is to be reversed in a recording operation, the brake magnet 29 must first be actuated, when the recording operation is initiated, in such a way that the brake rod 28 is pivoted away from the fixing position according to FIG. 9 so that the magnet 14 is freely movable within the bore 25. Under the effect of a recording magnet, the magnet 14 can now first be tilted and then swung round, so that the polarity N-S shown in the Figure is exactly reversed, that is to say, after the recording operation has ended, the south pole in FIG. 9 comes to rest on the left and the north pole on the right. After the recording operation has been completed, the brake magnet is de-energized and then, interacting with the iron plate 30, swings back into the fixing position according to FIG. 9 again.

FIGS. 10 to 12 illustrate another embodiment of the magnetic coding device according to the invention. The difference here is, above all, the braking device. As shown in FIG. 10, the braking device consists of a comb-like slide 32 which is guided in a groove 42 extending in the longitudinal direction of the holder 11. The slide 32 covers the bores 25. In one position of the slide 32, the gaps 33 of the slide 32 come to rest in alignment with the bores 25. This corresponds to a recording position in which the magnets 14 can be pivoted or swung round, as described above with reference to FIG. 9. In another end position of the slide 32, the bores 25 are concealed by the comb teeth 34 of the slide 32. This corresponds to the reproduction position in which the magnets 14 are fixed in place. The to-and-fro displacement of the slide 32 is again carried out, for example electromagnetically, by means of a lever-like element 37 which is mounted in a bearing bore 41 by means of a bearing lug 36 and to which the brake magnet 29 (not shown here) is fastened. The other angled end of the lever-like element 37 engages into a transverse slit 39 in the slide 32. When the angled lever-like element 37 is pivoted in the direction indicated by the arrow, the slide 32 is pushed to-and-fro, as can be seen.

The magnetic coding device 43 according to FIG. 13 has a holder 11 which is produced from a plastic strip. In the holder 11 there are continuous bores 35 for fastening it to a workpiece-carrier. There are also bores 25 countersunk from the rear, into which small, disk-shaped magnets 14 are inserted. After the magnets have been inserted, the bores are closed again, this not being shown in any more detail. The small, disk-shaped magnets are magnetized in the direction of their axes 44. One disk face is consequently a north pole N and the other is a south pole S. The small magnets have, for example, a diameter of three millimeters and a thickness of 1.2 millimeters. In contrast to this, the bores have, for example, a diameter of 3.5 millimeters. The small magnets 14 can therefore swing round freely in the bores 25. In the particular end position, the axis 44 of a magnet 14 is parallel to the axis 40 of the bore 25 in which it is located.

To retain the small magnets 14 in their respective end positions, a soft-magnetic contact device 20.1 is attached in front of each of the bores 25 to the front side 45 from which coding and reproduction are carried out. In the exemplary embodiment, this soft-magnetic contact device is circular, that is to say corresponding to the shape of the small magnets 14. The soft-magnetic contact devices can also have another shape, although it is expedient if this matches the shape of the particular magnets used and essentially covers the disk face of the associated magnet.

According to a preferred exemplary embodiment, a soft-magnetic powder, for example consisting of a material obtainable under the designation St37, is scattered to a thickness of approximately 0.2 millimeters on one end face of a magnetic disk 14 lying horizontally. A drop of low-viscosity curable quick-setting adhesive is then applied. The powder is not floated away by this drop since it is retained by the magnetic force of the magnetic disk. After the adhesive has cured, the plastic disk formed in this way, with the powder suspended in it, is drawn off from the magnet and glued onto the front side 45 of the holder 11. However, the disk formed in this way can also be inserted in a recess made in the front side 45. As a result, the soft-magnetic contact device 20.1 thus formed is protected from damage.

The soft-magnetic powder can also be suspended in a hardenable plastic in another way. In particular, it is possible, at the early stage of producing the plastic strip of the holder 11, to suspend the soft-magnetic powder at appropriate points in the plastic. As a result, the soft-magnetic contact devices are produced at the same time as the holder 11. The devices are therefore also protected against damage in the best possible way.

It is important to use at least enough powder to ensure that as a result of its soft-magnetic effect a magnetic disk 14 brought into an end position can also be retained in this end position. However, if too much powder is used, the magnetizing distance must be reduced because of very strong retention in the end position. However, this does not have a negative influence, but rather a positive influence on the distance of a Hall probe for measuring the coding. It has been established that the quantity of soft-magnetic powder can be selected so that it is possible, because of its focussing effect, to select a greater distance between a coding coil or a reproduction device and a small magnet than is possible without a soft-magnetic contact device designed according to the application. The best possible quantity of soft-magnetic powder to be used can be determined easily by tests. In the tests, it is necessary to ensure that as great a magnetizing distance and/or reproduction distance as possible is achieved, but that the soft-magnetic contact device still retains the small magnet sufficiently in its end position. The best possible choice depends on the intended use. In production in which the workpiece-carriers are exposed to practically no vibration, above all the best possible choice as regards a long magnetizing distance can be made. On the other hand, in magnetic coding devices for workpiece-carriers which are exposed to strong vibrations, it is necessary, above all, to ensure that aligned magnets are retained securely by the soft-magnetic contact device.

In the freely rotating magnetic disks of the design according to FIG. 13 or even of the design according to FIGS. 8 to 12, there is the problem that adjacent magentic disks can, when they swing round, exert such a great magnetic influence on one another that they retain one another in a position which does not correspond to a desired end position. In preferred small magnets with a diameter of three millimeters and a thickness of 1.2 millimeters, which have a very strong magnetic field, this effect arises at a distance between the bores 25 of approximately 12 millimeters. In this case, when two adjacent magnetic disks rotate with their axes 44 in that plane which connects adjacent bore axes 40 to one another, it can happen that the south pole of a small magnet is aligned exactly with the north pole of the adjacent small magnet. The axes 44 of the two adjacent small magnets 14 are then located in the direction 46 of longitudinal extension of the holder 11. The magnetic forces exerted on one another can be so high that a magnetic field applied from outside is no longer capable of swinging the two mutually retaining small magnets round completely into an end position.

To eliminate this effect even when bores 25 are closely adjacent to one another, an arrangement according to FIG. 14 is provided according to the application. Bars 47 parallel to one another and made of soft-magnetic material are attached to the front side 45 of the holder 11. Any two bars belonging to a bore 25 are attached symmetrically in relation to the bore axis 40 at a distance A from one another which corresponds essentially to the diameter D of a magnetic disk 14. The bars 47 are at right angles to the plane in which the bore axes 40 of adjacent bores 25 extend.

It has been shown that, in this arrangement, a magnetic disk 14 no longer swings round about any axis of rotation, but about an axis lying essentially in the plane in which adjacent bore axes 40 extend. As a result, it is no longer possible for a south pole and a north pole of directly adjacent magnetic disks 14 to point towards one another and retain one another in this position. Because of this, the distance between adjacent bores 25 can be further reduced in comparison with hitherto existing embodiments.

In the embodiment according to FIG. 14 also, there can be additional soft-magnetic contact devices, as in the embodiment according to FIG. 13. Soft-magnetic contact devices of this type are always suitable for retaining magnets in the end positions in magnetic coding devices according to the application, irrespective of whether the magnets are guided positively or can be swung round freely between the end positions.

All the magnetic coding arrangements according to the invention are characterized in that the magnets are hard-magnetic and their magnetization is not reversed for coding, but that they are brought into different positions. In this respect, embodiments are given by way of example for magnets mounted rotatably about one or more axes, magnets mounted tiltably about an axis, magnets which can be shifted to-and-fro and magnets which can tilt in a recess in a holder. The magnets can be retained in the end positions, irrespective of the special method of adjustability between the end positions, by means of frictional forces, fixing means or magnetic contacts. Especially simple embodiments are those in which the magnets are mounted tiltably in recesses in a holder and are retained by soft-magnetic contacts after they have been swung round.

Because, in magnetic coding arrangements according to the application, magnets are merely moved between two end positions, but their magnetization is not reversed, it is possible for very much greater recording distances to be maintained than has been possible hitherto. However, considerably greater reproduction distances can also be maintained. This is because hard magnets with as strong a field as possible can be chosen. In contrast to this, in previous magnetization-reversal methods, the magnets had to be selected so that their magnetization could be reversed with field intensities and distances which it was still possible to achieve under production conditions. However, this resulted in magnet materials with which it was not possible to obtain such strong fields as is possible with materials which are selected simply from the point of view of as strong a field as possible. As a result of reversal of magnetization, it was also impossible to obtain any excessively strong field because of the very process involved, so that, altogether, the reproduction distance was also considerably less than in arrangements according to the application.

I claim:

1. A magnetic coding arrangement for workpiece-carriers with a plurality of magnets mounted in a holder and the successive directions of magnetization of which represent a binary-coded decimal number, comprising:
   (a) a plurality of disk-shaped individual hard magnets mounted in bores in the holder for swinging around from one end position to the other; and
   (b) braking means actuated by a soft-magnetic contact device for retaining said magnets in a particular end position.

2. An arrangement as claimed in claim 1, wherein the magnets are mounted rotatably.

3. An arrangement as claimed in claim 1, wherein the magnets (25) are mounted displaceably in bores (25) in the holder.

4. An arrangement as claimed in claim 1, wherein the magnets have two unlike poles symmetrical to a bearing shaft mounted in the holder, and wherein the two end positions differ from one another in a magnet rotation through a predetermined angle.

5. An arrangement as claimed in claim 1, wherein the holder has bores in which the magnets can be shifted to-and-fro between the two ends.

6. An arrangement as claimed in claim 1, wherein the magnets are mounted so as to be movable counter to a frictional force.

7. An arrangement as claimed in claim 1, wherein the braking means can be lifted off from the magnets.

8. An arrangement as claimed in claim 1, wherein the soft-magnetic contact device consists of a layer of soft-magnetic powder.

9. A braking device of a magnetic coding arrangement for retaining individual disk-shaped magnets in a particular end position in bores of a holder which comprises two bars, parallel to one another, of a soft-magnetic material attaching to the holder, at right angles to its direction of longitudinal extension, at the points via which the magnets are coded by the outer magnetic field, the bars being arranged symmetrically in relation to the axis of the bore at a distance (A) from one another which corresponds approximately to the diameter (D) of a disk-shaped individual magnet.

10. A magnetic coding arrangement for workpiece-carriers, comprising:
(a) a plurality of magnets which are mounted in a holder and the successive directions of magnetization of which represent a binary-coded decimal number, wherein the magnets, designed as small disk-shaped individual magnets, are hard-magnetic, have a mounting with two end positions, and are mounted in bores in the holder in such a way that they can swing around from one end position to the other and are retained in the particular end position by a braking device; and
(b) two bars, parallel to one another and composed of a soft-magnetic material, which are attached to the holder, at right angles to its direction of longitudinal extension, at the points via which the magnets are coded by the outer magnetic field, the bars being arranged symmetrically in relation to the axis of the bore at a distance (A) from one another which corresponds approximately to the diameter (D) of a disk-shaped individual magnet.

* * * * *